(No Model.) 2 Sheets—Sheet 1.
F. B. GRISWOLD.
VEHICLE TIRE.
No. 596,499. Patented Jan. 4, 1898.
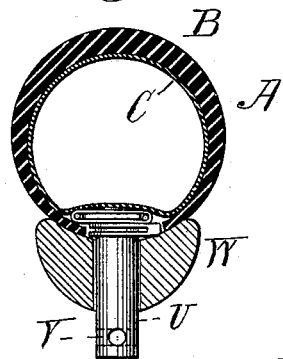
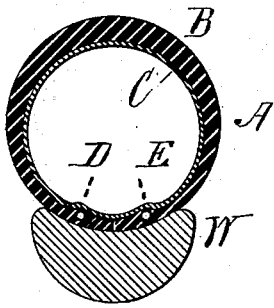
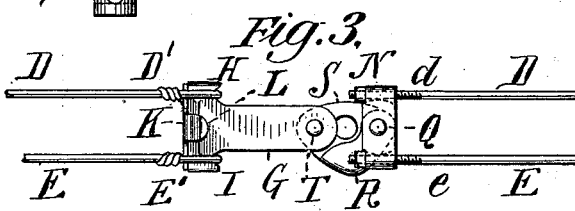
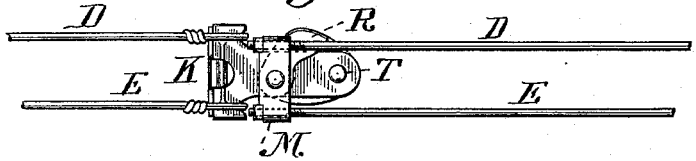
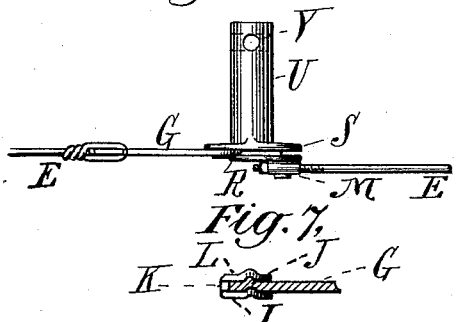
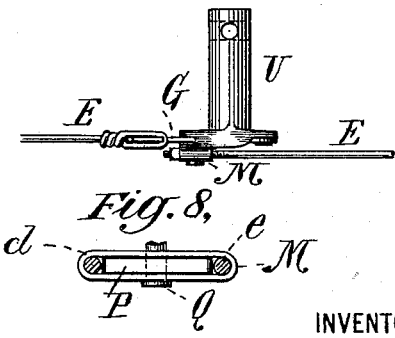
WITNESSES:
INVENTOR
Frank B. Griswold
BY
his ATTORNEY (No Model.) 2 Sheets—Sheet 2.
F. B. GRISWOLD.
VEHICLE TIRE.
No. 596,499. Patented Jan. 4, 1898.
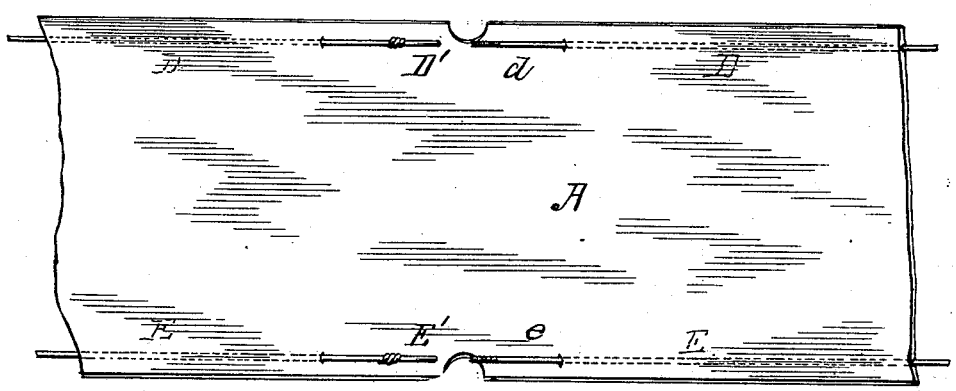
*Fig. 9,* *Fig. 10,*
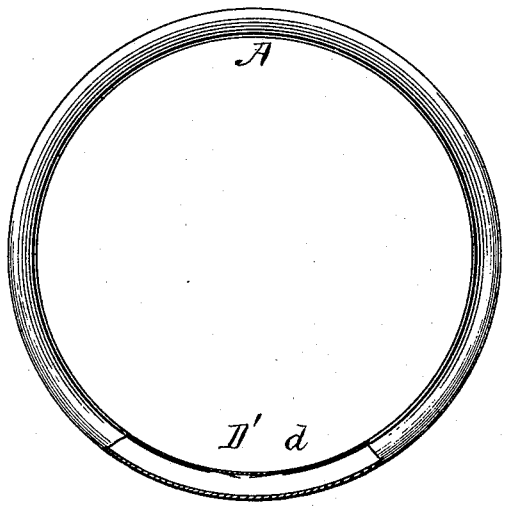
*Fig. 11,*
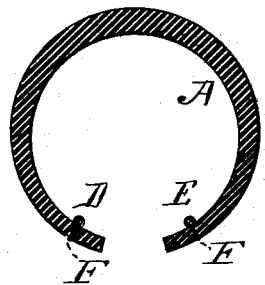
*Fig. 12,*
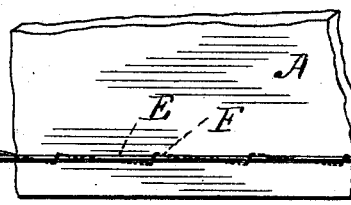
*Fig. 13,*
WITNESSES:
O. N. Haywood
H. R. Moeler
INVENTOR
Frank B. Griswold
BY Park Benjamin
ATTORNEY

UNITED STATES PATENT OFFICE.

FRANK B. GRISWOLD, OF TROY, NEW YORK.

VEHICLE-TIRE.

SPECIFICATION forming part of Letters Patent No. 596,499, dated January 4, 1898.

Application filed February 3, 1897. Serial No. 621,788. (No model.)

*To all whom it may concern:*

Be it known that I, FRANK B. GRISWOLD, of Troy, Rensselaer county, New York, have invented a new and useful Improvement in Vehicle-Tires, of which the following is a specification.

My invention relates to flexible tires, such as are commonly used on bicycles and other vehicles; and it consists in the combination, with such a tire, of wires secured thereto and adjacent to each edge, also in the combination, with such wires, of a tightening device whereby said tire may be detachably fastened upon the wheel-rim through causing a constriction of said wires around said rim.

In the accompanying drawings, Figure 1 is a transverse section of the tire, inflatable tube, and rim in juxtaposition and also the tightening device in side elevation. Fig. 2 is a transverse section of the tire, inflatable tube, and rim in juxtaposition at a different point from Fig. 1, showing the binding-wires embedded in the material of the tire. Fig. 3 is a plan view of the tightening device before it is set to tighten the band. Fig. 4 is a similar view of the tightening device after it has been set to tighten the band. Fig. 5 is a side elevation of the tightening device in the position shown in Fig. 3. Fig. 6 is a side elevation of the tightening device in the position shown in Fig. 4. Fig. 7 is a detail view in section, showing the mode of attachment of the releasing-clip to the ends of the binding-wire. Fig. 8 is a detail view, in cross-section, of the strap receiving the opposite ends of the band-wires and also showing the pivot-bar which secures said ends in said strap. Figs. 9 and 10 show the tire with the binding-wires protruding, all of the binding-wires except the ends being embedded in the tire, as represented in Fig. 2. Fig. 11 is a view of the tire reduced in size, showing the position of the ends of the binding-wires when the tire is brought into circular form upon the wheel. Fig. 12 is a sectional view of the tire, showing the binding-wires secured thereto by stitching. Fig. 13 is a plan view showing the binding-wires stitched with fine wire upon the surface of the tire.

Similar letters of reference indicate like parts.

A represents the tire. This may be made of rubber, leather, canvas, or any other suitable material or fabric, and it may be thickened at the tread B, if desired, but this thickening is not essential. The tire may be in arch form, normally in cross-section, and when of rubber may be vulcanized in that form, or it may be in the form of a flat band and bent in arch form when placed upon the rim.

C is the inflatable tube, of rubber or other suitable material, which may be placed inside of the tire A, and serving when distended by compressed air as a support for the said tire; but the employment of such an inner inflatable tube is not essential to my invention, for, as is well known, a tire such as A may be made sufficiently thick or resilient by reason of its material as not to require under certain loads the use of an inner supporting-tube or the presence within it of any body of confined compressed air.

D and E are two wires, preferably of steel. These wires are secured to the tire A on the side which comes innermost when the tire is in place on the rim and respectively in proximity to the edges of said tire which are approximated when the tire is in place. The said wires may be embedded in the material of the wire itself, as shown in Figs. 2, 9, and 10, or they may be simply laid upon the surface of the tire and connected thereto by any suitable means, as by a stitching of fine wire F, as illustrated in Figs. 12 and 13. In whatever way these wires are connected to the tire their ends D' d E' e are left protruding, as shown in Figs. 9, 10, and 11.

I desire it to be understood that a tire such as described, provided with wires secured thereto and having protruding ends, may in itself constitute a separate article of manufacture and sale, and that my present invention includes such a tire with wires, as aforesaid, irrespective of the device, which, as will be hereinafter explained, is connected to the ends of the wires to produce a constriction of said wires upon the wheel-rim.

The tightening and connecting device to which the aforesaid ends d and e of the wires are connected is represented in Figs. 3 and 4. It is constructed as follows:

G is a metal plate having on each side shoulders H and I to receive eyes, formed by twisting or any other suitable means, upon the ends D' E' of the wires D E. Upon the plate G is formed a rib J, Fig. 7.

K, Fig. 3, is a bar which rests against the edge of the plate G. The said bar is provided with bent-over clips L, Figs. 3 and 7, which are suitably formed to engage with the rib J, as shown in said Fig. 7. In order to secure the eyes of the ends D' E' to the plate G, the bar K is first slid to one side—that is to say, for example, as shown in the drawings, Fig. 3. The eye on the end D' of wire D is then put over a shoulder H. The bar K is then slid so as to enter an angle of the eye and substantially fill the hitherto unfilled portion of the eye. In doing this the bar K is slid in a direction upward for a sufficient distance to allow the eye on the end E' of the wire E to be placed upon the shoulder I of the plate G, and then finally the bar K is slid down, so that its end fills the space in that eye, the result being that the clip L takes a middle position, as shown in Fig. 3, while the two ends of the bar K are received in the two eyes at the ends D' E' of the wires D E. The bar K therefore serves to prevent the eyes on the ends D' E' from becoming disengaged, accidentally or otherwise, from the shoulders H I of the plate G, while at the same time by suitably manipulating the bar K the eyes can be disengaged from the plate G at will. The ends $d\,e$ of the wires D E are threaded and pass through the strap M, Fig. 8, and are set up by nuts N on the other side, as shown in Fig. 3. In order to prevent these ends from coming out of the strap M, I provide in said strap a pivot-bar P, secured by a pivot-pin Q. By turning this bar transversely the strap the ends $d\,e$ of the wires D E may be easily introduced into the strap and the nuts applied, and then by turning the bar P into a position parallel with the strap, as shown in Fig. 8, the ends $d\,e$ are prevented from coming out of said strap. Of course by turning the bar P in a direction at an angle to said strap and removing the nuts N the ends $d\,e$ may be released. The advantage of threading the ends $d\,e$ and providing them with nuts, as N, is to enable the initial length of the wires D E to be regulated by means of said nuts. The pivot-pin Q of the strap M is received in a plate R, which is on the lower side of the sector-shaped plate S. The plate G is pivoted at T. The plate R is connected at its outer edge to the under side of plate S, or the said plate R may be formed integral with plate S and bent over parallel therewith. In any case there is a space or interval between the plate S and the plate R. Rigidly attached to the opposite side of the plate S is a rod U, provided with an aperture V, through which may be inserted any convenient lever in order to turn said rod.

The operation of the device is as follows: The tire A, having the wires D E in place and with the tightening device shown in Figs. 3 and 4 connected to the ends of the wires, is placed upon the wheel-rim W, so as to encircle the same. If there is to be an inner inflatable tube, as C, it is inserted in a collapsed state within the tire, and the rigid valve-tube, which is generally connected to such inflatable tube, is inserted in the usual way through the opening in the rim. The edges of the tire are approximated, substantially as shown in Fig. 2, and the rod U is passed through a suitable aperture in the rim. On rotating the rod U the plate S is also rotated, so as to bring the plate G into the interval between said plate S and the under side of plate R, the parts then assuming the positions shown in Fig. 4, whereby, as is evident, the ends $d\,e$ of the wires are brought more closely together, thus binding the wires around the wheel-rim and securely binding the tire thereto.

I claim—

1. A flexible vehicle-tire in band form having wires D, E secured to it near its edges, the plate G, plate S pivoted to said plate G and carrying the plate R, and the strap M secured to plate R, the said wires D, E having their extremities connected to said plate G and said plate R, substantially as described.

2. In combination with a flexible vehicle-tire, the wires D, E secured thereto, substantially as set forth, and a tightening device interposed between and connecting the ends of said wires and including the plate G having shoulders H, I, and the sliding bar K thereon; the said shoulders H, I being constructed to receive loops or eyes on the ends D', E' of said wires, and the bar K to enter said loops, substantially as described.

3. The combination with a flexible vehicle-tire, the wires D, E secured thereto, substantially as set forth, and a tightening device interposed between and connecting the ends of said wires and including the strap M containing the pivoted bar P; the said strap being constructed to receive the ends $d, e$ of said wires and the said bar P operating as set forth to hold said ends in said strap, substantially as described.

FRANK B. GRISWOLD.

Witnesses:
 H. R. MOLLER,
 I. A. VAN WART.